UNITED STATES PATENT OFFICE.

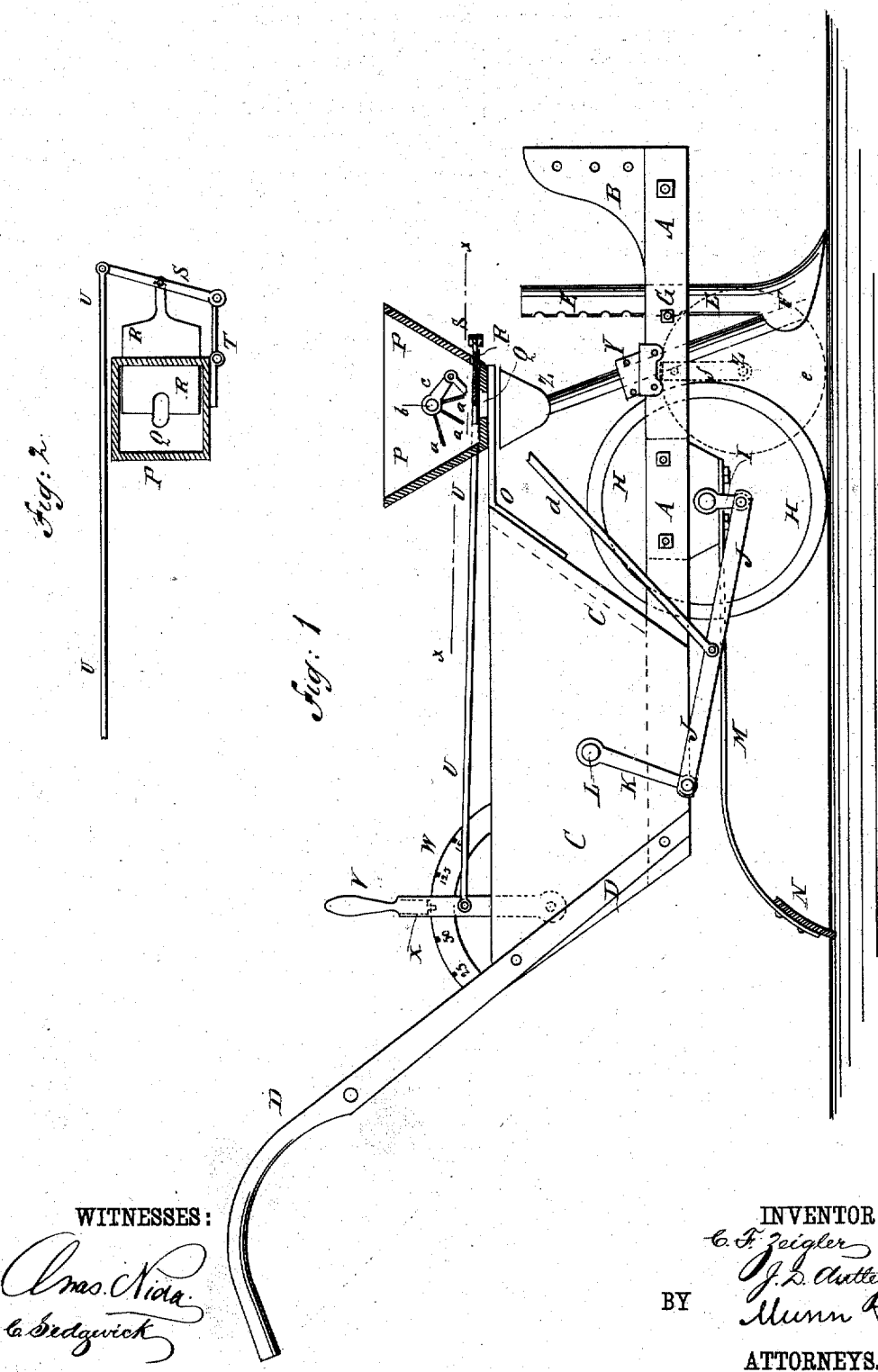

CHARLES F. ZEIGLER AND JOHN D. AUTLEY, OF ST. MATTHEW'S, SOUTH CAROLINA.

COMBINED SEED-PLANTER AND FERTILIZER-DISTRIBUTER.

SPECIFICATION forming part of Letters Patent No. 331,600, dated December 1, 1885.

Application filed July 7, 1885. Serial No. 170,866. (No model.)

*To all whom it may concern:*

Be it known that we, CHARLES F. ZEIGLER and JOHN D. AUTLEY, both of St. Matthew's, in the county of Orangeburg and State of South Carolina, have invented certain new and useful Improvements in a Combined Seed-Planter and Fertilizer-Distributer, of which the following is a full, clear, and exact description.

Reference is to be had to the accompanying drawings, forming part of this specification, in which similar letters of reference indicate corresponding parts in both figures.

Figure 1 is a side elevation of one of our improved machines, partly in section and part being broken away. Fig. 2 is a sectional plan view of a part of the same, taken through the line $x\,x$, Fig. 1.

The object of this invention is to provide combined seed-planters and fertilizer-distributers, constructed in such a manner that the discharge of the fertilizer can be readily controlled or stopped, and which shall be simple in construction and reliable in operation.

The invention consists in the construction and combination of various parts of the machine, as will be hereinafter fully described, and then pointed out in the claim.

A represents the frame of an ordinary seed-planter, to the forward end of which is secured an upwardly-projecting draw-bar, B, and to its rear end are secured the seed-box C and the handles D. To the forward part of the frame A is secured the standard E, to the lower end of which is attached, or upon it is formed, a plow, F, to open a furrow to receive the fertilizer. The rear edge of the standard E is recessed to receive the bolt G, which passes through the frame A, so that the standard E can be readily raised or lowered to cause the plow F to open a furrow to a greater or less depth, as may be required. The fertilizer is covered by soil thrown upon it by two disks, e, attached to a standard, f, secured to the beam A, in the rear of the standard E. The disks e are set with their forward parts inclined toward each other, to cause them to throw soil into the furrow and cover the fertilizer.

In bearings attached to the frame A a little in front of the seed-box C revolve the journals of the wheel H, the rim of which is made V-shaped, to open a channel to receive the seed.

To one of the journals of the wheel H is attached a short crank, I, to which is pivoted the end of a connecting-rod, J. The other end of the connecting-rod J is pivoted to a longer crank, K, attached to the end of the agitator-shaft L, so that the said agitator-shaft will be rocked by the revolution of the wheel H.

To the bearings of the journals of the wheel H or to the frame A are attached the forward ends of the spring-bars M, the rear parts of which are curved downward, and to their rear ends is attached the covering-plate N.

As thus far described there is nothing new in the construction.

To a bracket, O, attached to the upper forward part of the seed-box C, is attached a hopper, P, to receive the fertilizer, and which has an oblong opening, Q, in its bottom for the escape of the said fertilizer. The size of the discharge-opening Q is regulated by a sliding plate, R, placed upon the bottom of the hopper, P, and passing through a slot in the forward side of the said hopper. To the projecting forward end of the sliding plate R is pivoted a short lever, S, one end of which is pivoted to a support, T, hinged to a lower corner of the hopper P. To the other end of the short lever S is hinged the forward end of a connecting-rod, U, the other end of which is pivoted to the lever V. The lower end of the lever V is pivoted to the seed-box C or other suitable support. The upper part of the lever V moves along the side of an arched bar, W, and is provided with a spring pawl or tooth, X, as indicated in dotted lines in Fig. 1, to engage with recesses in the catch-bar W, and hold the lever V, and with it the gage-slide R, in any position into which they may be adjusted. The recesses in the catch-bar W are formed in such positions that when the lever V is at one of the said recesses the discharge-opening Q will be uncovered to such an extent that a fixed amount of fertilizer will be distributed to the acre. The recesses in the catch-plate W are marked with numbers showing how many pounds of the fertilizer to the acre will be distributed when the lever V stands opposite said recesses. With this construction the sliding plate R can be adjusted to cause the machine to distribute more or less fertilizer to the acre without stopping the horse. This construction also allows the operator to prevent the discharge of the fertilizer—as, for instance, when turning the machine and when passing from place to place.

To the frame A, a little in rear of the standard E, is secured by a clamp, Y, a tube or spout, Z, the upper end of which is flared and is placed beneath the discharge-opening in the bottom of the hopper P, so as to receive the fertilizer as it escapes from the said opening and guide it into the furrow opened by the plow F. The fertilizer in the hopper is agitated, so that it will pass out freely through the discharge-opening Q, by fingers $a$, attached to the shaft $b$, which rocks in bearings in the sides of the hopper P, and has a short crank, $c$, attached to one of its ends. To the crank $c$ is pivoted the upper end of a connecting-rod, $d$, the lower end of which is pivoted to the connecting rod J, so that the said agitator will be operated by the movement of the said connecting-rod J. With this construction, as the machine is drawn forward the plow F opens a furrow, the fertilizer is deposited in the said furrow, and is covered by soil thrown by the disks $e$. The wheel H then opens a channel in the soil above the fertilizer, the seed is dropped into it, and is covered by the covering-plate N.

Having thus described our invention, we claim as new and desire to secure by Letters Patent—

In a combined seed-planter and fertilizer-distributer, the combination, with the hopper, of the gage-slide provided with a central extension or projection on one end, a transverse lever pivoted about centrally to the gage-slide extension or projection, and pivoted at one end to a hinged support and at its other end to a rod connecting with a hand-lever, substantially as and for the purpose set forth.

C. F. ZEIGLER.
JOHN D. AUTLEY.

Witnesses:
JOHN M. WEEKS,
PHILIP RICH.

It is hereby certified that the name of one of the patentees in Letters Patent No. 331,600, granted December 1, 1885, for an improvement in "A Combined Seed-Planter and Fertilizer-Distributer," was erroneously written and printed "John D. Autley," whereas said name should have been written and printed *John D. Antley;* and that said Letters Patent should be read with this correction therein that the same may conform to the record of the case in the Patent Office.

Signed, countersigned, and sealed this 5th day of January, A. D. 1886.

[SEAL.]

H. L. MULDROW,
*Acting Secretary of the Interior.*

Countersigned:
    R. B. VANCE,
        *Acting Commissioner of Patents.*